Figure 1:
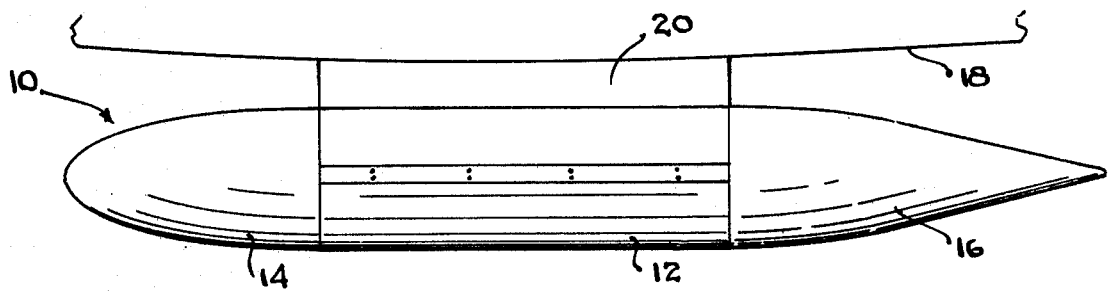
Figure 2C:
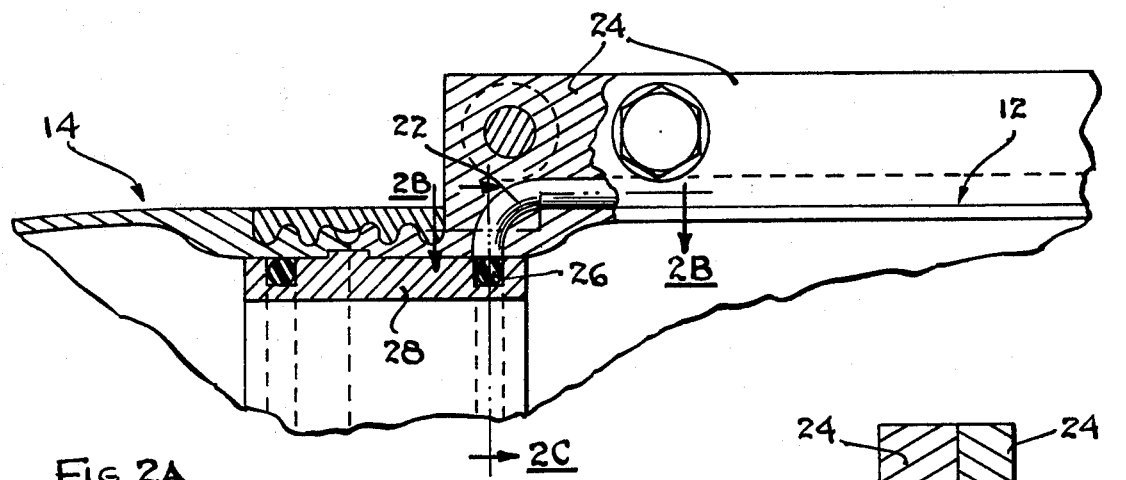
Figure 2C:
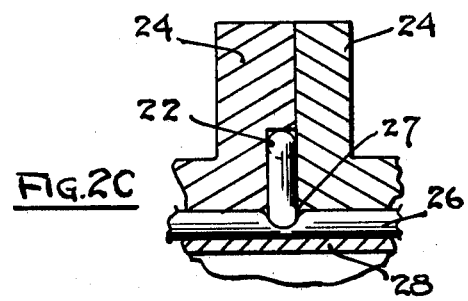
Figure 2B:
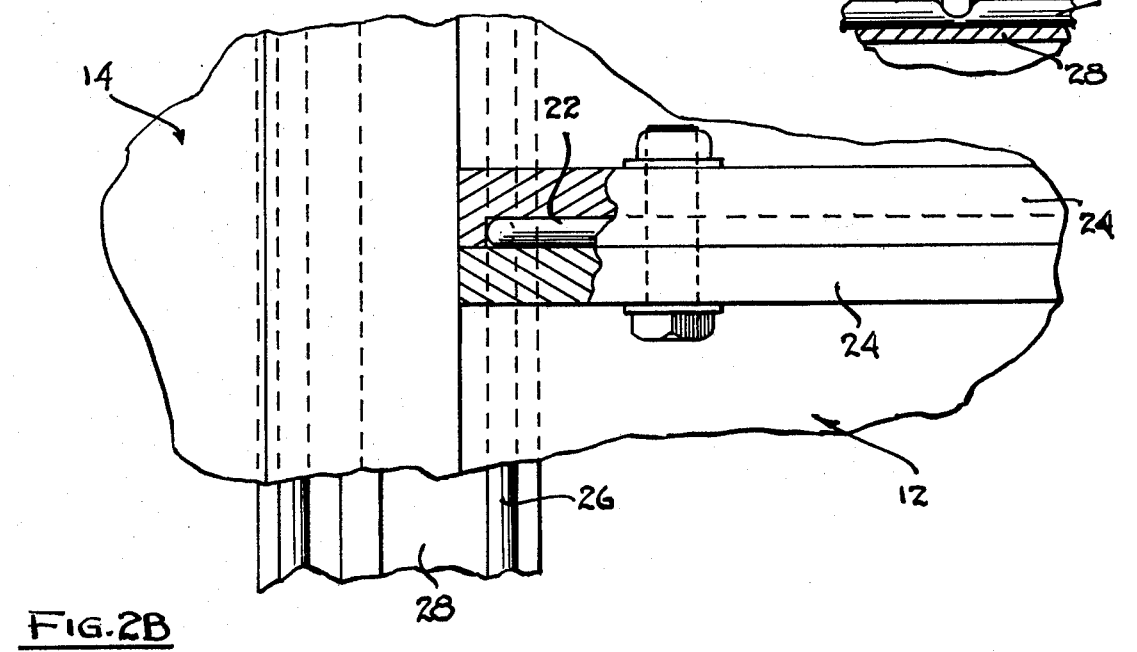

United States Patent [19]

Page

[11] 4,108,328
[45] Aug. 22, 1978

[54] AIRCRAFT FUEL TANK CONSTRUCTION
[75] Inventor: Darrell Page, Walnut, Calif.
[73] Assignee: Sargent Fletcher Company, El Monte, Calif.
[21] Appl. No.: 848,581
[22] Filed: Nov. 4, 1977
[51] Int. Cl.² .............................................. B65D 7/12
[52] U.S. Cl. ...................................... 220/5 A; 220/1 B; 220/319; 220/81 R; 244/135 R; 285/371
[58] Field of Search .................. 220/5 A, 5 R, 76, 80, 220/319, 81 R, 1 B; 244/131, 135 R; 285/371, 398

[56] References Cited
U.S. PATENT DOCUMENTS

| 2,811,274 | 10/1957 | Wilson | 220/5 A |
| 2,876,923 | 3/1959 | McLane et al. | 220/5 A |
| 2,895,635 | 7/1959 | Pollard et al. | 220/5 A |
| 3,302,814 | 2/1967 | Dohner | 220/5 A |
| 3,469,730 | 9/1969 | Neff et al. | 220/5 A |

Primary Examiner—William Price
Assistant Examiner—J. Moy
Attorney, Agent, or Firm—Thomas A. Seeman

[57] ABSTRACT

An aircraft fuel tank construction for the type of fuel tank which is fabricated by joining a split cylindrical center section with two conical end sections and which is disassembled during shipment and storage. The center section is joined together by a connecting plate which maintains a gap between the joined ends at a fixed, predetermined width for optimum sealing effectiveness of an interposed elastomeric seal. Owing to the manner of construction, the seal may be seated and then visually inspected for potential leakage before the center section is joined. Leakage at the interface of each end section seal with the center section seal is avoided during expansion or contraction of the center section seal by the center seal being suitably positioned to slide over the end seal during such movement. The tank is free from drag-producing obstructions as all joints are flush with the surface of the tank.

1 Claim, 10 Drawing Figures

FIG. 2A — PRIOR ART —

AIRCRAFT FUEL TANK CONSTRUCTION

BACKGROUND OF THE INVENTION

This invention relates to an aircraft fuel tank construction and more particularly to construction of a fuel tank which is assembled from a cylindrical center section, a conical nose section and a conical tail section, and which is disassembled during shipment and storage.

For military purposes, it is desirable to manufacture lightweight refueling tanks in sections which can be nested during shipment and storage for maximum storage capacity but so constructed that they can be quickly and easily assembled in securely connected, fully sealed, liquid tight relationship. To enable the center section, and center sections of other such tanks, to be nested one within the other and thus form a compact package, the center section is formed with a longitudinal gap throughout its length. The side walls of the section facing the gap are connected together and the gap sealed when the center section is assembled with the two end sections. The end sections are sealed at their juncture with the center section by a circumferential end seal, which is also in sealing contact with the seal for the center section. Such a tank construction is described in U.S. Pat. No. 2,876,923.

There are several problems associated with known tank constructions. In some tank constructions, the center section is joined by fasteners and the width of the gap is not fixed but dependent on the degree to which the fasteners are tightened. With this type of construction, the center section seal may either be overcompressed or undercompressed by improperly torquing the fasteners, which may make the seal ineffective. Another problem is that overtorquing the fasteners by unskilled personnel may cause the center section seal to elongate and resultingly compress the end seals at their interface with the center section seal, thereby resulting in a fuel leakage path at this point. Similarly, contraction or expansion of the center section seal due to temperature changes may also cause the tank to leak at the interface of the seals because of the relative movement between the seals.

Another problem associated with known fuel tanks is that often the center section seal cannot be visually inspected after the seal is seated. As a consequence, an improperly seated seal cannot be detected until the fuel tank is filled with fuel and a leak occurs.

Another problem of known fuel tanks is that one or more of the joints of the fuel tank may protrude above the surface of the tank causing an increase in aerodynamic drag.

BRIEF SUMMARY OF INVENTION

Accordingly, it is a broad object of this invention to provide an aircraft fuel tank which may be disassembled and nested during shipment and storage and which can be easily and quickly assembled in the field with fluid tight integrity by unskilled personnel.

Another object is to provide a means of connecting a center tank section together whereby in connecting the section, an interposed seal can not be overcompressed or undercompressed by unskilled personnel.

Still another object is to provide an aircraft fuel tank construction having a gap through the center section of a fixed, predetermined width for optimum sealing effectiveness of an interposed, elastomeric seal.

A further object is to provided an aircraft fuel tank construction wherein expansion or contraction of the center section seal will not adversely affect the sealing integrity of the tank.

Another object is to provide an aircraft fuel tank construction wherein the seal for the center section of the tank may be seated and visually inspected before the section is joined.

Another object is to provide an aircraft fuel tank construction having an effective sealing interface between the center section seal and the conical end section seals.

Another object is to provide an aerodynamically efficient aircraft fuel tank construction wherein all joints are flush with the surface of the tank.

Another object is to provide an aircraft fuel tank which can be economically and feasibly manufactured.

Other objects of the invention will in part be obvious and will in part appear hereinafter.

In accordance with these objects, the invention comprises an aircraft fuel tank assembled from three sections: a conical nose section, a conical tail section, and a split cylindrical center section.

The center section is formed with a pair of opposed, recessed, grooved flanges having end walls facing the gap in the section. One of the flanges carries a base plate that extends underneath the gap to the bottom of the opposite flange, thereby forming a three-sided receptacle with the end walls of the flanges. An elastomeric seal is seated within the receptacle to seal the gap. Since the seal is visible when seated, it may be inspected for proper seating prior to connecting the center section together.

After the seal is seated and inspected, the center section is connected together by a connecting plate having depending tongues which are engaged and interlocked with the grooves on the recessed flanges. The distance across opposing tongues of the plate is specifically dimensioned to maintain the gap at a predetermined width for optimum sealing of the interposed seal. Because the flanges are recessed, the connecting plate is flush with the skin of the tank after being clamped to the center section by mounting screws or bolts, and thus there are no drag-creating obstructions at the connection.

The conical end sections of the tank are joined to the center section by a retaining ring clamped over recessed end flanges in a tongue and groove relationship similar to the manner in which the center section is connected. The joint for each end section is sealed by a pair of O-rings carried within channels of a seal retaining ring underlying the joint. Means are provided to prevent the sealing ring from laterally shifting relative to the joint.

When the conical end sections are joined to the center section, the center section seal is arranged to overlap and to slide over one of the O-rings when the center section seal is contracted or elongated by temperature differentials, thus avoiding any leakage at the interface of the seals. The center section seal also has a rectangular cross section at each end to completely seal the housing within which it is enclosed and thereby prevent any leakage through the ends of the seal.

Owing to the simplicity of construction, the tank is particularly feasible and economical to manufacture.

The invention accordingly comprises the features of construction, combination of elements and arrangement of parts which will be exemplified in the construction hereinafter set forth, and the scope of the invention will be indicated in the claims.

clamped, installation of the connecting plate also facilitates the alignment of the recessed flanges 30, 32.

Figure 8:
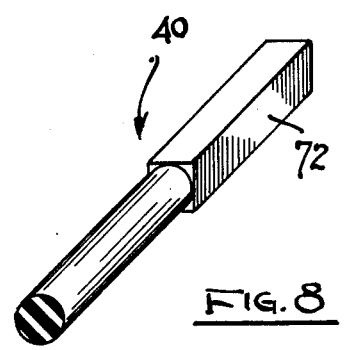

As shown in FIG. 8, center seal 40 has a rectangular cross section at each end to completely fill the gap between flanges 32, 34, bottom plate 34, and connecting plate 38 at each end of the center section and thereby prevent any leakage through the end of the seal as will hereinafter be further explained. As should be obvious, the seal has a circular cross section through most of its length to provide voids at the corners of the gap for the expansion of the seal when it is compressed.

Flanges 30, 32 are recessed to receive the connecting plate flush with or below the exterior surface of the tank so as not to create an obstruction at the connection which would produce an undesirable aerodynamic drag. For this reason, the heads of screws 44 are also countersunk within the connecting plate.

Figure 3:
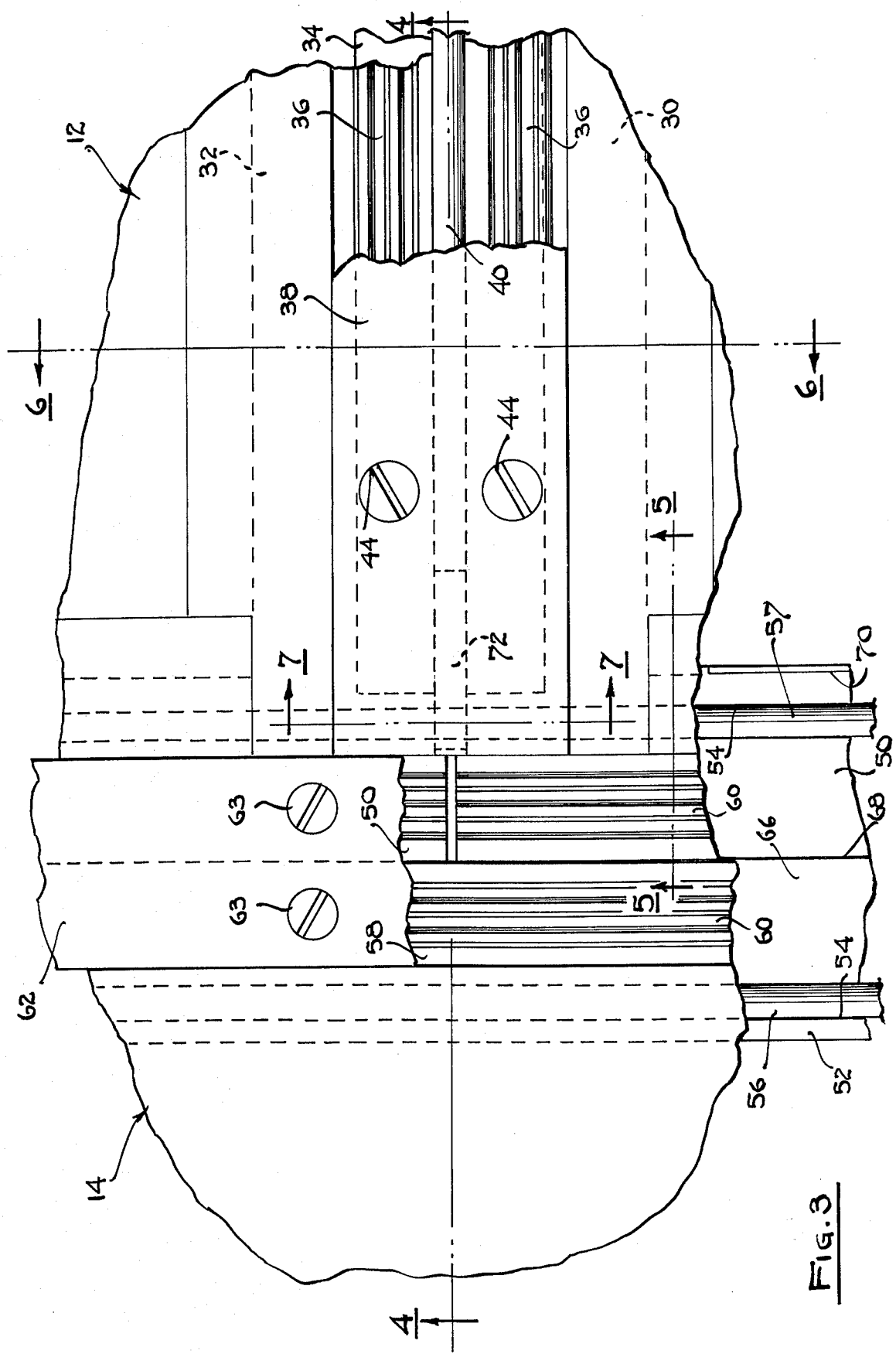
Figure 4:
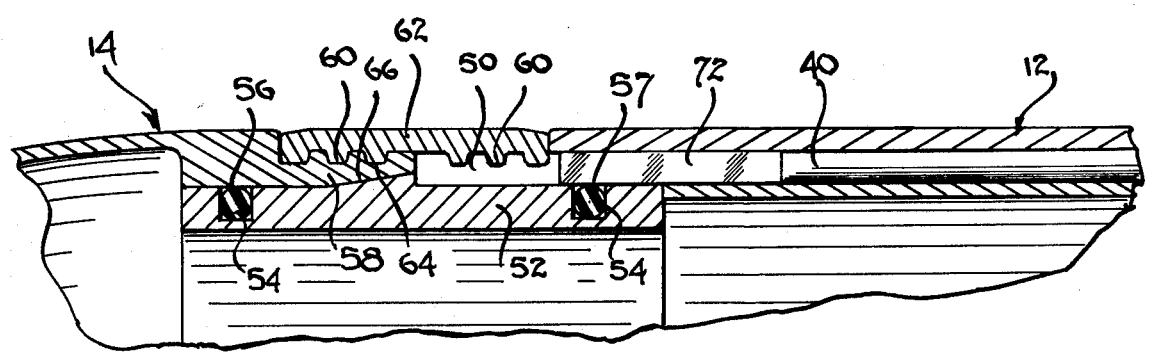

The manner in which the conical nose section 14 is joined to center section 12 is best seen in FIGS. 3 and 4. Although the following will be limited to the manner in which the nose section is attached to the center section, it should be understood that the tail section is attached to the center section in exactly the same manner, but the description thereof will be omitted in the interest of brevity.

Center section 12 carries about its circumference at its front and rear ends a recessed end flange 50, only the front flange being shown. As best seen in FIG. 4, flange 50 is installed over a cylindrical, seal retaining ring 52 having a pair of U-shaped channels 54 housing a pair of O-ring seals 56, 57. Nose section 14 is formed at its open end with a continuous, recessed flange 58, similar in configuration to flange 50, which is placed over seal retaining ring 52 and butted against flange 50, as shown. Both end flanges 50, 58 have parallel grooves 60 about their circumference. To join the end flanges, a split, connecting ring 62 having depending parallel tongues 64 is clamped on top of the flanges by sealed, recessed screws or bolts 63, only two of which are shown, which extend into nuts, not shown, attached to the bottom of the seal retaining ring 52. When the ring is installed, tongues 64 of the ring are in interlocking engagement with grooves 60 of the flanges. Similar to the connecting plate 38, connecting ring 62 is recessed flush with or below the exterior surface of the tank for reduction of aerodynamic drag.

When the center section 12 is joined to nose section 14, the first of said O-ring seals 56 bears against the inner circumference of the nose section 14, thereby sealing the forward end of the transverse joint against leakage, and the second O-ring seal 57 bears against the inner circumference of center section 12, thereby sealing the rearward end of the transverse joint against leakage.

To facilitate the engagement of the nose section with the retaining ring, flange 58 of nose section 14 sweeps outwardly at the bottom end thereof. To compensate for the upward sweep of flange 58, seal retaining ring 52 is also formed with an upward slanting wall 66 about its circumference to mate with the flange.

Figure 5:
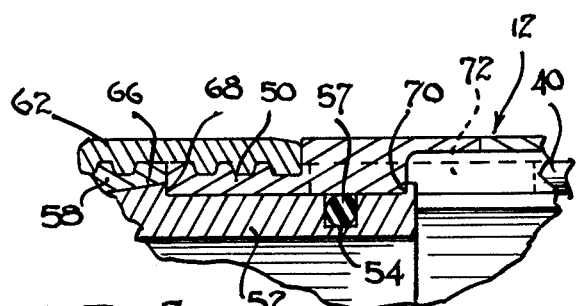
Figure 6:
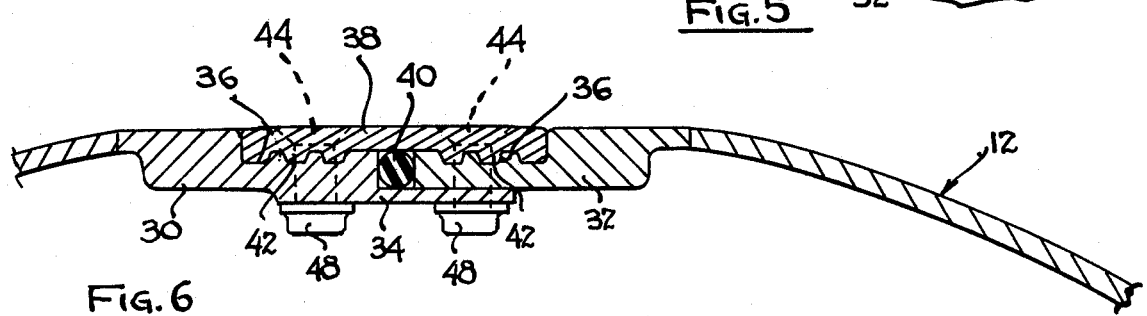

Seal retaining ring 52 also has lateral restraining means to prevent the ring from sliding laterally relative to the transverse joint. This lateral restraining means is provided by a pair of shoulders 68, 70 on the circumference of the ring, best seen in FIG. 5. The left shoulder 68 as viewed butts the forward end of the recessed flange 50 of the center section, and the right shoulder 70 butts the rearward end of flange 50. Shoulder 68 prevents the ring 52 from sliding rearwardly, or to the right as viewed, and conversely, shoulder 70 prevents the ring from sliding forwardly, or to the left as viewed.

The retaining ring 52 and the above described manner of joining the nose section 14 to the center section 12 are known in the art.

To overcome the problem of excessive elongation (or contraction) of the center section seal 40 adversely affecting the sealing integrity of the tank, each end of the center section seal is designed to overlap each respective O-ring seal 57 in a sliding, sealing relationship. That is, the center section 12 is positioned so that the ends of the seal are tangent to the outer surface of O-ring seals 57 whereby any contraction or expansion of the center section seal will cause the seal to slide over the seals 57 and not compress or pull away from seals 57.

Figure 7:
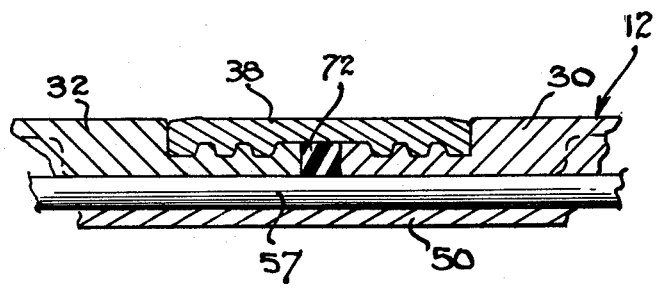

As best seen in FIGS. 7 and 8, the end 72 of the center section seal is of a rectangular configuration to correspond with and entirely fill the gap formed between the opposing side walls of the recessed end flanges of the center section, and between the connecting plate and bottom plate. This prevents any fluid from seeping through the ends of the seal 40 at the interface of seal 40 and seals 57.

From the above description, it should now be evident that a novel and advantageous fuel tank construction has been provided. Advantageously, the center section is joined with a connecting plate which fixes the width of the gap between the side walls of the section and which will not leave undesirable obstructions that would interfere with the air flow over the tank. Since a predetermined gap is maintained throughout the length of the center section, a seal of a selected dimension may be placed in the gap for optimum sealing effectiveness. Moreover, the seal may be visually inspected for proper sealing prior to complete assembly. Advantageously, the above is combined with an improved interface of the center section seal with each end section seal which permits the center section seal to contract or elongate without affecting the fluid integrity of the tank. In addition, the assembly of the tank can be easily and quickly accomplished by unskilled personnel with reliability, and owing to its simplicity of construction, the tank is feasible and economical to manufacture.

While I have typically described a certain embodiment of my invention, it is of course to be understood that the invention is not limited to that particular embodiment or form, but rather is applicable broadly to numerous variations falling within the scope of the appended claims.

I claim:

1. An aircraft fuel tank construction comprising:
   a. a cylindrical center section and a conical end section attached to the front and rear ends of the center section;
   b. the center section including a pair of opposing recessed flanges with side walls defining a gap throughout the length of the center section, the outer surface of said flanges having grooves parallel to one another and parallel to the side walls of the flanges, a bottom plate attached to the bottom of one of said flanges and extending under said gap and in juxtaposition with the bottom of the other of said flanges, and a flexible center section seal interposed between and in contact with the side walls of the flanges for sealing said gap;

c. a connecting plate connecting said flanges together, said connecting plate having depending parallel tongues extending into and interlocked with the grooves of said flanges, and the connecting plate being clamped substantially flush with or below the exterior of said tank;

d. the center section further including a recessed end flange carried about its circumference at each end thereof, and each of said end flanges having on its outer face circumferentially extending parallel grooves;

e. each conical end section having a recessed flange carried about its open end, and each of said conical section flanges having on its outer face circumferentially extending parallel grooves;

f. each conical section flange lying adjacent center section end flange at each end of the center section;

g. a split connecting ring joining said conical section flange and center section end flange at each end of the center section, said connecting ring having depending parallel tongues extending into and interlocked with the circumferential grooves of said conical section and center section end flanges, and said connecting ring being clamped substantially flush with or below the exterior of said tank;

h. a cylindrical seal retaining ring underlying the joint between each conical end section and the center section, said retaining rings carrying a pair of O-ring seals for sealing each of said joints, a first of said O-ring seals contacting the inner circumference of said center section and sealing thereby one end of the joint and a second of said O-ring seals contacting the inner circumference of said conical end section and sealing thereby the other end of said joint;

i. interlocking means for interlocking said seal retaining ring against lateral movement with respect to the joint; and j. said center section seal lying in a direction tangent to and in sliding contact with the outer surface of the first of said O-ring seals at each end of said center section, and said center section seal completely filling and sealing the gap between the recessed end flanges of the center section at the interface of the seals.

* * * * *